United States Patent
Alberth, Jr. et al.

(10) Patent No.: US 7,206,847 B1
(45) Date of Patent: Apr. 17, 2007

(54) SMART CARD WITH BACK UP

(75) Inventors: William P. Alberth, Jr., Crystal Lake, IL (US); Michael Kotzin, Buffalo Grove, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/575,749

(22) Filed: May 22, 2000

(51) Int. Cl.
G06F 15/16 (2006.01)

(52) U.S. Cl. .................. 709/229; 713/172; 705/40; 705/41; 235/379

(58) Field of Classification Search .......... 713/172; 705/40, 41; 235/379; 709/229
See application file for complete search history.

(56) References Cited

U.S. PATENT DOCUMENTS

| | | | | |
|---|---|---|---|---|
| 5,311,595 A | * | 5/1994 | Bjerrum et al. | 713/169 |
| 5,434,395 A | * | 7/1995 | Storck et al. | 235/380 |
| 5,497,418 A | * | 3/1996 | Kudelski | 380/242 |
| 5,763,862 A | * | 6/1998 | Jachimowicz et al. | 235/380 |
| 5,787,101 A | * | 7/1998 | Kelly | 714/800 |
| 5,923,759 A | * | 7/1999 | Lee | 713/159 |
| 5,978,840 A | * | 11/1999 | Nguyen et al. | 709/217 |
| 5,979,773 A | * | 11/1999 | Findley et al. | 235/492 |
| 6,003,014 A | * | 12/1999 | Lee et al. | 705/217 |
| 6,003,134 A | * | 12/1999 | Kuo et al. | 713/200 |
| 6,289,324 B1 | * | 9/2001 | Kawan | 705/41 |
| 6,324,525 B1 | * | 11/2001 | Kramer et al. | 705/40 |
| 6,351,813 B1 | * | 2/2002 | Mooney et al. | 713/185 |
| 6,581,162 B1 | * | 6/2003 | Angelo et al. | 713/193 |

OTHER PUBLICATIONS

Baldwin et al., "Locking the e-safe", RSA Data Security, IEEE Spectrum, Feb. 1997.
Fancher, C., "In Your Pocket Smartcards", IEEE Spectrum, Feb. 1997, pp. 47.

* cited by examiner

*Primary Examiner*—David Wiley
*Assistant Examiner*—Kyung Hye Shin
(74) *Attorney, Agent, or Firm*—Brian M. Mancini; Matthew C. Loppnow

(57) ABSTRACT

Smart card security is enhanced by making the smart card a two-piece device. Both parts of the smart card contain copies of user data and a processor, which executes program instructions stored in the smart card half so as to give each part of the two-part smart card security and intelligence. Both parts must be in communication with each other for the data in either card to be accessible and useable. By separating the two pieces, data compromise is virtually impossible.

17 Claims, 2 Drawing Sheets

SMART CARD WITH BACK UP

FIELD OF THE INVENTION

This invention relates to data security devices. In particular, this invention relates to a method and apparatus for securely storing data in a personal data security device commonly known as a smart card.

BACKGROUND OF THE INVENTION

"Smart cards" as they are known, physically resemble the now ubiquitous credit cards but their similarities end there. These credit-card replacements are described in the literature. By way of example, they are described in an article appearing on page 47 of the February 1997 edition of the IEEE Spectrum magazine which is entitled "In Your Pocket Smartcards" by Carol Hovenga Fancher.

While smart cards physically resemble credit cards, smart cards are far more powerful in that they have one or more microcontrollers embedded in them which manage access to, and storage of, sensitive data that is actually stored in memory devices on the smart card. Data that might be stored in a smart card includes bank account numbers, personal data as well as a complete medical history, or the electronic equivalent of currency. Smart cards are widely used in Europe and are expected to eventually replace the library of cards most people carry and which include credit cards, phone cards, transit passes, frequent flyer cards, car rental cards and social security card.

Credit cards on the other hand, as well as debit cards and "ATM" (automatic teller machine) cards are mere sheets of plastic that are embossed with a series of numbers and letters that represent either the card number or an account number. A strip of magnetized material that is typically attached to one side of the card is programmed (magnetized) with a limited amount of data, typically the same number that is embossed on the card. When the card is "swiped" through a reader, information programmed into the magnetic strip is read.

While the security systems employed with smart cards is quite robust, losing a smart card might be considered to be roughly the equivalent of losing a wallet or purse—filled with money. Accordingly, for those who use a smart card and who want the highest possible security there will always exist the need for additional security measures.

SUMMARY OF THE INVENTION

The security of a personal data storage device (a smart card) is enhanced by providing to the smart card an additional layer of security in the form of an enabling key, which when coupled to the smart card enables the processor on the smart card to access and change storage information. If the enabling key is not accessible to the smart card, the smart card remains disabled.

In one embodiment the enabling key is physically connected to a terminal of the smart card. In another embodiment, a wireless radio link between the enabling key and smart card is used.

In every embodiment, the smart card is disabled if the enabling key and its own processor and data are not detected and accessed by the smart card. An additional level of security is realized by physically detaching (or geographically separating) the smart card and the enabling key in which event the smart card is disabled, preventing theft. If the key-fob enabling key is lost, intelligence on the smart card provides the smart card issuer sufficient data with which the key can be replicated. If the smart card is lost by the key fob is still available, data on the fob permits the card issuer to recreate the smart card data in its entirety.

DETAILED DESCRIPTION OF THE PREFERRED EMBODIMENT

Figure 1:
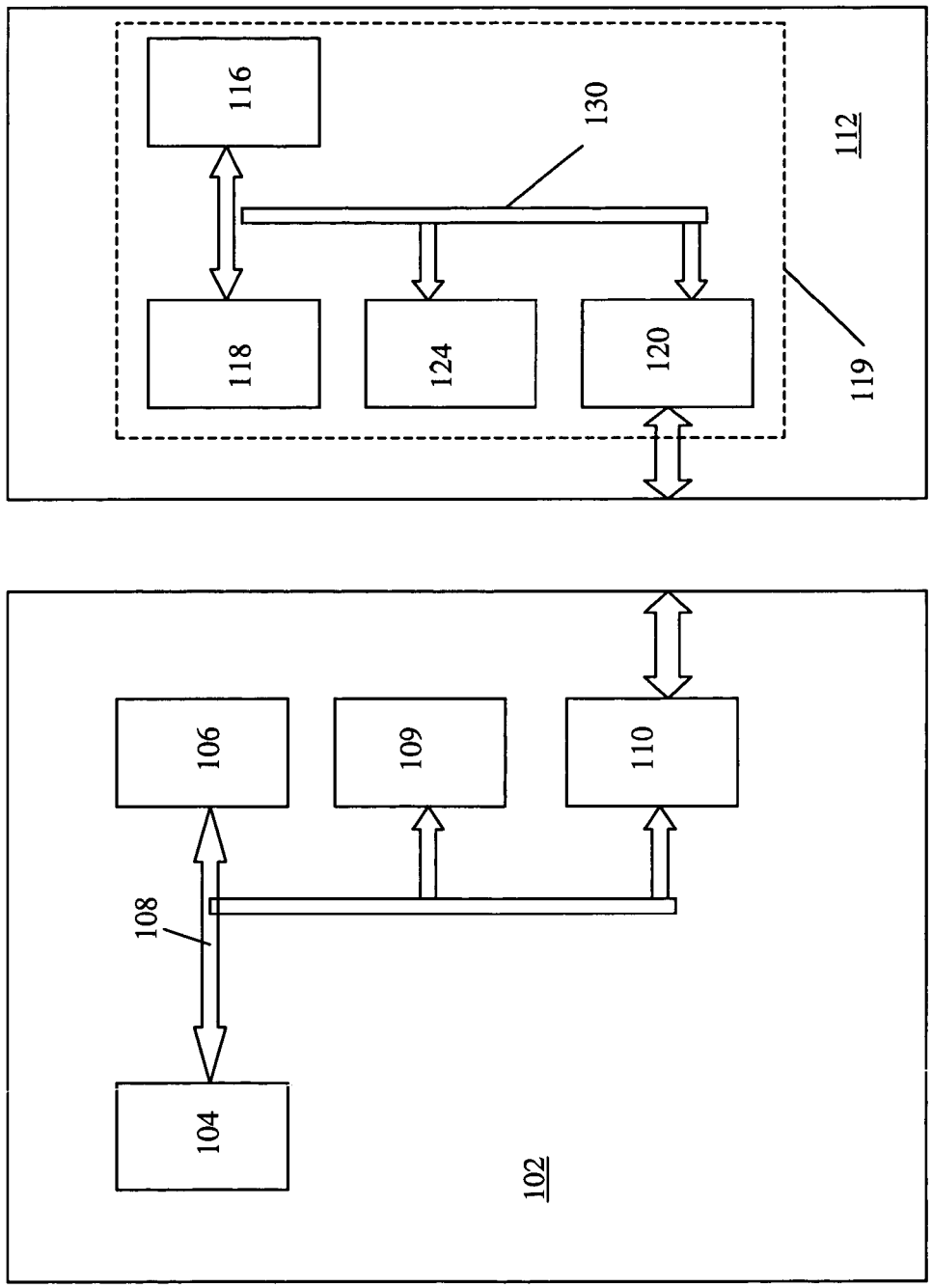
FIG. 1 depicts a simplified representation of a two-part smart card, both parts of which are required to provide smart card functionality.

FIG. 1 shows a simplified representation of a two-part personal data storage device, also known as a smart card 100 which provides increased security for sensitive user data such as credit card numbers, bank account numbers, medical history, electronic cash equivalency. Such data and data or information and records of similar import is referred to hereinafter as a set of user data.

A first part of the smart card 102 includes within it a processor 104 and at least one memory device, typically electrically erasable programmable read only memory 106 (EEPROM) but also possibly including read only memory (ROM) as well as random access memory (RAM), accessible via an address/data bus 108 that effectively couples together, devices that are operatively coupled to the bus 108.

As those skilled in the art will recognize, semiconductor memory can readily be placed on the substrate for the processor 104 as well as on its own separate substrate. In addition to the processor 104 and memory, a bi-directional data interface 110, which is also coupled to the bus 108, provides a mechanism by which the first part of the smart card 102 can communicate with external devices, such as the second part 112 of the two-part smart card 100. The bi-directional data interface 110 is also coupled to the processor 104 and memory 106 through the bus 108.

The second part 112 of the two-part smart card 100 also incorporates within it a processor 116, memory 118 and an I/O port 120, all of which are coupled together via a separate bus 130. The I/O port 120 can be considered to be a second interface circuit. The first and second interface circuits (110 and 120 respectively) grant communications access to the respective first and second smart card parts (102, 112 respectively). Electrical and mechanical coupling between the first and second ports 110, 120 so as to achieve an electrical connection between the two smart card parts is preferably accomplished using any appropriate mechanical electrical connector device (not shown but known to those skilled in the connector art) but selected depending upon the desired physical characteristics of the smart car when the two portions are together. Alternate embodiments would include using a RF data link, an optical link or an infrared link as well.

As shown in FIG. 1, a broken line 119 serves only to represent that all of the functionality of the second part 112 is embodied on a single piece of silicon, which in the preferred embodiment is also how the functional elements of the first part 102 are packaged.

The first part 102 of the smart card is considered hereinafter to be a first user data storage device in that it actually stores a first set of a users data (such as that listed above) within memory devices physically part of the device. The second part 112 of the smart card is considered to be a second user data storage device in that it too stores the first set of user data within it.

With respect to both of the smart card parts, the processors 104, 116 (within the corresponding smart card parts 102, 112) are coupled to the various circuits within each portion of the respective smart card parts by way of the busses 108, 130 which carry information between the various circuits that are coupled to it. By way of the busses, the processors are able to execute the instructions stored in various memory devices 106, 118 coupled to the busses 108, 130. The programs stored in memory give the smart card portions intelligence. Various data can be written into the first smart card part 102 via the data interface circuit 110 such as a serial or parallel computer-to-computer data link (RS-232, IEEE 488, or other equivalent data pathway) or perhaps via a wireless RF data port 109, (but also including an optical or infrared data port as well), coupled to the processor 104. With respect to the second smart card port 112, data can be written into the second smart card via its own similar data port 120 or perhaps its own wireless port 124. Once data is written into the smart card parts, accessing the data or changing it is controlled by security measures designed into the smart card processor software. By appropriate program instructions and an appropriate reader, a smart card issuer can read data stored in memory of either smart card half, and reconstruct data in a missing half in that the respective halves of the smart card can be made to be substantially duplicate copies of each other.

Enhanced smart card security is achieved by denying access to the data stored in the first part of the smart card 102, if the second part 112 is not accessible to the first part 102 (and vice versa), by either a wireless data exchange or a direct, electrical connection between the first and second parts. Software that controls the processor in the first part 104 denies access to stored data in the first part 104 if the second part of the card 112 is considered to be missing (or inaccessible to the first part). Similarly, access to data in the second part 112 is denied if the first part of the card 104 is missing from the second part (or inaccessible). By separating the two parts of the card, a card owner can effectively preclude anyone from using the card or accessing information stored in the respective parts.

Stored data security is enhanced even further if the data stored in the smart card parts is encrypted using data encryption techniques described in the prior art. Data security techniques for smart cards is disclosed in the literature. See for example "Locking the e-safe" by Robert W. Baldwin and C. Victor Chang of RSA Data Security, Inc. published in the February 1997 edition of the IEEE Spectrum, the teaching of which is incorporated herein by reference.

Figure 2:
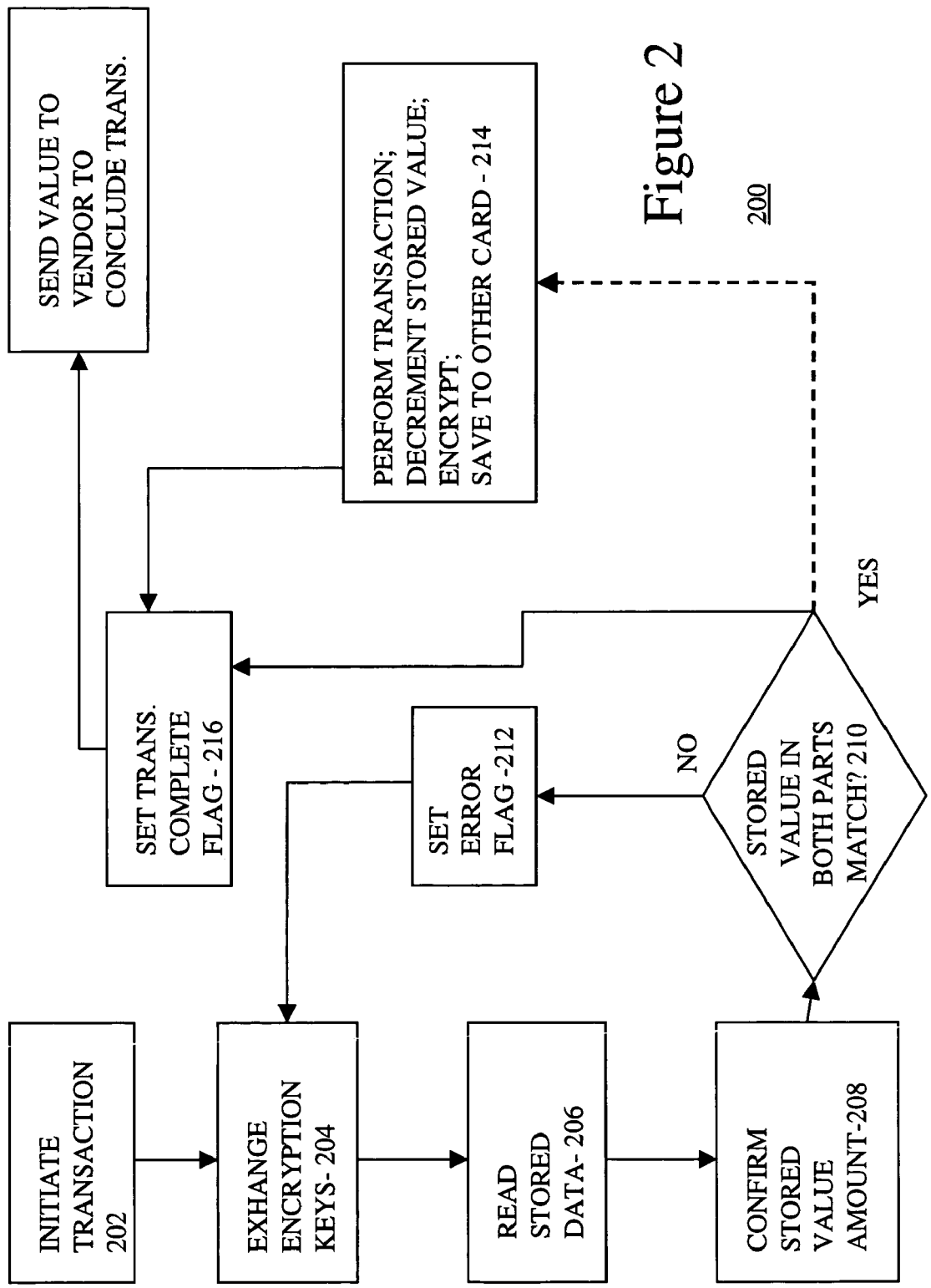
FIG. 2 depicts a simplified flow chart of the disclosed method.

A transaction using the two-part smart card preferably proceeds according to the steps of the method 200 depicted in FIG. 2. In step 202, the two-part smart card user initiates a desired transaction, which might include reading or writing a medical record or purchasing goods or services using data stored in the smart card that represents currency of the card user. Before any data within the smart card 100 can be accessed or changed, a data handshake between the processor 104 and a terminal of a vendor or merchant takes place via the wireless port 109 or the I/O port 110 either of which can be considered a first interface circuit. The first and second interface circuits grant conditional communications access to the data using an appropriate data exchange protocol. Various protocols as are known in the art can be used.

After the initial data handshake of a transaction is initiated, software within the first part of the smart card 102 and the second part of the smart card 112 exchange encryption keys which are required to access stored information. In a preferred, embodiment, the first and second encryption keys are the same. In step 204, software programmed into the first part 102 of the smart card confirms that the second part 112 is the unique mate to the first part by way of the encryption key exchange.

In the preferred embodiment of the invention, a first set of user data (to be referred to as stored value) resides in both part 102 and part 112 of the two-part smart card. In step 206, the first part of the smart card 102 reads stored value from the second part after the stored value is encrypted by the processor 116 of the second part 112 in order to prevent interception of the data as it crosses the boundary between the first and second parts 102, 112 respectively.

In step 208, after receiving the encrypted stored value, which the first part 102 decrypts, the first part confirms that the value it received from the second part identically matches the value stored in the first part 102. If as in step 210, the value received into the first part 102 does not match the value stored in the second part, one or both parts sets an error condition flag 212 and re-attempts to confirm the identity of the second part by returning to step 204.

If the value received (or perhaps other user data, such as the user's medical history) into the first part 102 matches the amount that was stored in the second part 112, the processor 102 sets a transaction complete flag in step 216 and proceeds to conclude the transaction that was started in step 202. If the smart card user is purchasing some goods or service or performing some other transaction (as indicated by the broken line from decision block 210), value is transferred from the first part via the I/O port 110 or the wireless connection or link 109 to compatible data equipment of the vendor. In step 214, a financial transaction is performed (buying goods or services for example, or the stored value is incremented or decremented by a financial institution for instance), the processor in the first part 104 adjusts the stored value by the amount that was transferred, encrypts the new value and transfers the new value to the second part 112 for storage. By preventing transactions unless both parts are available throughout the entire transaction, the issuer of the smart card is guaranteed that the stored value is always the same in both parts.

Increased security is realized if the first and second smart card parts are separated.

By physically or electrically separating the two parts, it becomes impossible to access data stored in the second part 112 or in the first part 102. In the event one piece is lost, by using data stored in the complementary piece, the smart card issuer or agent thereof, (having appropriate software and hardware, which is recognized by the software of the smart part parts 102, 112) can recreate the data stored in the other part because both card parts carry duplicate copies of data stored in each other. In applications like pre-paid phone cards and the like, economic loss caused by physical card loss can be reduced by keeping part of the card in the user's possession at all times.

By using a two-part smart card that is designed to require that both halves be in communication with each other, the likelihood of data loss or economic theft is reduced. Inasmuch as the halves can be physically separated, by keeping one half of the card secure, data in the other half is fully protected. If either half of the card is lost or destroyed, the remaining value or data can be recovered to the user by the card issuer.

We claim:
1. A personal data storage apparatus comprised of:
   a. a first personal data storage device including a memory device storing:
      i. a first set of user data;
      ii. a first encryption key for encrypting at least part of said first set of user data;
   b. a first interface circuit coupled to said memory device granting conditional access to a third device to data therein using an appropriate data exchange protocol between the first personal data storage device and the third device only when a second personal data storage device is operatively coupled to said first personal data storage device;
   c. a second interface circuit coupled to said memory device and providing communications access to the second personal data storage device; and
   d. a processor, operatively coupled to said memory device and to said first and second interface circuits, the processor configured to adjust the first set of user data to create an adjusted first set of user data in response to a transaction with the third device, the processor further configured to encrypt the adjusted first set of user data to create an encrypted adjusted first set of user data, and the processor further configured to transfer the encrypted adjusted first set of user data to the second personal data storage device via the second interface circuit.

2. The personal data storage apparatus of claim 1 wherein said second personal data storage device is operatively coupled to said first personal storage device using a mechanical coupling.

3. The personal data storage apparatus of claim 2 wherein said mechanical coupling is a connector.

4. The personal data storage apparatus of claim 1 wherein said second personal data storage device is operatively coupled to said first personal storage device using a wireless connection.

5. The personal data storage apparatus of claim 4 wherein said wireless connection is a radio link.

6. The personal data storage apparatus of claim 1, where an agent of the issuer of the personal data storage apparatus can reclaim the user data from a single part of the personal data storage apparatus.

7. A personal data storage apparatus comprised of:
   a. a first personal data storage device comprising:
      i. a first memory device storing:
         1. a first set of user data;
         2. a first encryption key for encrypting at least part said first set of user data;
      ii. a first interface circuit coupled to said memory device granting conditional access to data therein using a predetermined protocol and only when a second personal data storage device is operatively coupled to said first personal data storage device;
      iii. a second interface circuit coupled to said memory device and providing access to a second personal data storage device;
   b. a second personal data storage device coupled to said first personal data storage device and being comprised of:
      i. the second memory device storing:
         1. a substantially duplicate copy of said first set of user data;
      c. a second encryption key for encrypting at least part said first set of user data;
      ii. a second interface circuit coupled to said memory device granting conditional access to data therein using a predetermined protocol and only when said second personal data storage device is operatively coupled to said first personal data storage device;
   whereby user data in either said first or second personal data storage device is accessible and usable only when said first and second personal data storage devices are in communication with each other, and
   wherein said first personal data storage device is further comprised of a processor, operatively coupled to said first memory device and to said first and second interface circuits, the processor configured to adjust the first set of user data to create an adjusted first set of user data in response to a transaction with a third device, the processor further configured to encrypt the adjusted first set of user data to create an encrypted adjusted first set of user data, and the processor further configured to transfer the encrypted adjusted first set of user data to the second personal data storage device.

8. The personal data storage apparatus of claim 7 wherein said second personal data storage device is operatively coupled to said first personal storage device using a mechanical connector.

9. The personal data storage apparatus of claim 7 wherein said second personal data storage is operatively coupled to said first personal storage device using a wireless connection.

10. The personal data storage apparatus of claim 7 wherein said wireless connection is a radio link.

11. The personal data storage apparatus of claim 7, where an agent of the issuer of the personal data storage apparatus can reclaim the user data from a single part of the personal data storage apparatus.

12. A method of securing access to data stored in a personal data storage device comprised of the steps of:
   a. storing personal data in first and second data storage devices that are capable of being operably coupled to each other;
   b. encrypting said personal data in a first data storage device using a first encryption key and encrypting the data in said second data storage device using a second encryption key;
   c. granting access to a third device to said personal data in either said first data storage device or said second data storage device only when said first and second data storage devices are operatively coupled together;
   d. adjusting the personal data to create an adjusted personal data in response to a transaction with the third device if access is granted to the third device to the personal data in either the first data storage device or the second data storage device;
   e. encrypting the adjusted personal data to create an encrypted adjusted personal data; and
   f. transferring the encrypted adjusted personal data to the second data storage device.

13. The method of claim 12 wherein said step of granting access to a third device to said personal data in either said first data storage device or said second data storage device only when said first and second personal data storage devices are operatively coupled together is comprised of the step of granting access when said first and second personal data storage devices are coupled together through at least one of either a wireless data link or a mechanical connector.

14. The method of claim 12 wherein data stored in said first storage device can be recovered from data stored in said second storage device.

15. The method of claim 12 wherein said first and second encryption keys are the same.

16. A method of securing access to data stored in a personal data storage device comprised of the steps of:
   a. storing personal data in a smart card and an enabling key device that are capable of being operably coupled to each other;
   b. encrypting said personal data in the smart card using a first encryption key and encrypting said personal data in the enabling key device using a second encryption key;
   c. prohibiting a transaction between the smart card and another device unless the smart card and the enabling key device are operatively coupled together;
   d. adjusting the personal data in the smart card to create an adjusted personal data in response to a transaction affecting the personal data if the smart card and the enabling key device are operatively coupled together;
   e. encrypting the adjusted personal data to create an encrypted adjusted personal data; and
   f. transferring the encrypted adjusted personal data to the enabling key device.

17. The method of claim 16, wherein said step of prohibiting a transaction between the smart card and another device unless the smart card and the enabling key device are operatively coupled together is comprised of the step of prohibiting the transaction unless the smart card and the enabling key device are coupled together through at least one of either a wireless data link or a mechanical connector.

* * * * *